United States Patent
Mitsutani

(10) Patent No.: US 8,443,779 B2
(45) Date of Patent: May 21, 2013

(54) BOOSTING SYSTEM FAILURE DIAGNOSIS DEVICE, BOOSTING CIRCUIT CONTROLLER AND VEHICLE

(75) Inventor: Noritake Mitsutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 981 days.

(21) Appl. No.: 12/448,878

(22) PCT Filed: Jan. 28, 2008

(86) PCT No.: PCT/JP2008/051700
§ 371 (c)(1),
(2), (4) Date: Jul. 13, 2009

(87) PCT Pub. No.: WO2008/099693
PCT Pub. Date: Aug. 21, 2008

(65) Prior Publication Data
US 2010/0026311 A1 Feb. 4, 2010

(30) Foreign Application Priority Data

Feb. 13, 2007 (JP) ................................ 2007-031908

(51) Int. Cl.
*B60K 6/445* (2007.10)
*B60L 3/00* (2006.01)
*B60L 11/14* (2006.01)
*B60L 3/12* (2006.01)

(52) U.S. Cl.
USPC ..................... 123/198 D; 73/114.77; 324/537

(58) Field of Classification Search
USPC ..................... 123/198 D; 324/537; 73/114.77
See application file for complete search history.

(56) References Cited

U.S. PATENT DOCUMENTS

| 4,398,187 | A  * | 8/1983  | Fukushima et al. | ........... 340/626 |
| 8,131,498 | B1 * | 3/2012  | McCauley         | ..................... 702/139 |
| 2006/0179926 | A1 * | 8/2006 | Hasegawa | ......................... 73/73 |
| 2006/0184308 | A1 * | 8/2006 | Hasegawa et al. | ............ 701/114 |
| 2006/0184309 | A1 | 8/2006 | Hasegawa | |
| 2006/0184310 | A1 * | 8/2006 | Hasegawa | ..................... 701/114 |
| 2006/0277907 | A1 | 12/2006 | Ueda et al. | |

FOREIGN PATENT DOCUMENTS

| JP | A-59-188530 | 10/1984 |
| JP | A-2006-50863 | 2/2006 |
| JP | A-2006-226136 | 8/2006 |
| JP | A-2006-288170 | 10/2006 |
| JP | A-2006-348778 | 12/2006 |

* cited by examiner

*Primary Examiner* — Stephen K Cronin
*Assistant Examiner* — Arnold Castro
(74) *Attorney, Agent, or Firm* — Oliff & Berridge, PLC

(57) ABSTRACT

A boosting converter and a boosting control unit are mounted on a vehicle. A failure diagnosis unit makes a failure diagnosis of an atmospheric pressure sensor based on a detection result of the atmospheric pressure sensor and on a detection result of an intake pressure sensor detecting engine intake pressure that changes in accordance with a change in the atmospheric pressure. Boosting control unit controls an output voltage of the boosting converter based on the detection result of atmospheric pressure sensor and the detection result of intake pressure sensor.

13 Claims, 12 Drawing Sheets

BOOSTING SYSTEM FAILURE DIAGNOSIS DEVICE, BOOSTING CIRCUIT CONTROLLER AND VEHICLE

TECHNICAL FIELD

The present invention relates to a boosting system failure diagnosis device, a boosting circuit controller and a vehicle. More specifically, the invention relates to control of a boosting system that controls an output voltage in accordance with atmospheric pressure.

BACKGROUND ART

Recently, with environmental concerns on the background, hybrid vehicles and electric vehicles have attracting attention. These vehicles mount an electric motor as a driving power source, and a secondary battery, for example, is used as an electric power source. Some of these vehicles include a boosting converter provided between the secondary battery and an inverter driving the electric motor. When electric power is supplied from the secondary battery to the electric motor, the boosting converter boosts the voltage and, therefore, the electric motor can operate even if rated voltage of secondary battery is lower than the rated voltage of electric motor.

By way of example, Japanese Patent Laying-Open No. 2006-50863 discloses an example of a vehicle having a boosting converter. In the vehicle, the boosting converter boosts voltage of a DC power source and supplies the voltage to an inverter driving an electric motor. The vehicle includes a controller that calculates a voltage command value based on the speed of rotation of the electric motor and an input voltage to the inverter, and controls an output voltage of the boosting converter based on the voltage command value.

Generally, in high-voltage equipment, possibility of discharge increases as atmospheric pressure decreases. In a vehicle provided with an electric motor, it is possible that inter-phase dielectric resistance of the electric motor decreases when the vehicle runs at high altitude. A possible method of protecting the electric motor when atmospheric pressure lowers is to mount an atmospheric pressure sensor on the vehicle and to adjust the input voltage of the inverter (that is, an output voltage of boosting converter), based on the output from the atmospheric pressure sensor.

Use of such a method is on the premise that the atmospheric pressure sensor has high reliability. Japanese Patent Laying-Open No. 2006-50863 does not specifically describe a method of controlling the boosting converter in consideration of atmospheric pressure variation.

DISCLOSURE OF THE INVENTION

An object of the present invention is to provide a failure diagnosis device, a boosting circuit controller and a vehicle that can improve reliability of a boosting system controlling an output voltage in accordance with atmospheric pressure.

In summary, the present invention provides a failure diagnosis device for a boosting system, including an atmospheric pressure sensor for detecting atmospheric pressure and for outputting the detected atmospheric pressure as a first detection result, a boosting circuit for boosting an input voltage and for providing an output voltage, and a control unit for controlling the output voltage of the boosting circuit based on the first detection result. The failure diagnosis device includes a physical amount sensor for detecting a physical amount that changes in accordance with the atmospheric pressure and for outputting the detected physical amount as a second detection result, and a diagnosis unit for making a failure diagnosis of the atmospheric pressure sensor based on the first and second detection results.

Preferably, the boosting system and the failure diagnosis device are mounted on a vehicle having an internal combustion engine. The physical amount sensor detects intake pressure of the internal combustion engine as the physical amount.

More preferably, when the internal combustion engine stops, the diagnosis unit starts diagnosis of the atmospheric pressure sensor after the intake pressure of the internal combustion engine becomes substantially equal to the atmospheric pressure.

More preferably, the diagnosis unit determines a time period from a time point at which the internal combustion engine stops until diagnosis of the atmospheric pressure sensor is started, based on a state of operation of the internal combustion engine until the internal combustion engine stops.

More preferably, when the internal combustion engine is operating, the diagnosis unit makes a diagnosis of the atmospheric pressure sensor in a case where a condition as a predetermined condition for the intake pressure to stabilize is satisfied.

More preferably, the internal combustion engine has a throttle valve for adjusting amount of intake air to itself. The diagnosis unit estimates the intake pressure of the internal combustion engine based on a state of operation of the internal combustion engine. The predetermined condition is that a state, in which opening position of the throttle valve is equal to or lager than a prescribed value and difference between the intake pressure of the internal combustion engine estimated by the diagnosis unit and the second detection result is within a prescribed range, is continued for a prescribed time period or longer.

More preferably, the internal combustion engine is provided with an air flow meter for measuring an amount of intake air of the internal combustion engine. The diagnosis unit holds in advance a theoretical value of the amount of intake air of the internal combustion engine when the internal combustion engine operates under prescribed atmospheric pressure. The diagnosis unit corrects the second detection result based on a difference between the theoretical value and a value measured by the air flow meter. The diagnosis unit makes a failure diagnosis of the atmospheric pressure sensor based on the result of correction.

More preferably, the diagnosis unit determines the atmospheric pressure sensor to be normal in a case difference between the first and second detection results is within a tolerable range. The tolerable range is determined in advance to be different when the internal combustion engine is stopped and when the internal combustion engine is operating.

More preferably, the diagnosis unit subtracts the first detection result from the second detection result and determines whether or not the result of subtraction is within the tolerable range. A lower limit of the tolerable range is a negative value. An upper limit of the tolerable range is a positive value smaller than the absolute value of the lower limit.

According to another aspect, the present invention provides a controller for a boosting circuit including: an atmospheric pressure sensor for detecting atmospheric pressure and for outputting the detected atmospheric pressure as a first detection result; a physical amount sensor for detecting a physical amount that changes in accordance with the atmospheric pressure and for outputting the detected physical amount as a second detection result; and a boosting control unit for controlling an output voltage of the boosting circuit based on the first and second detection results.

Preferably, the boosting circuit and the controller are mounted on a vehicle having an internal combustion engine. The physical amount sensor detects intake pressure of the internal combustion engine as the physical amount.

More preferably, the boosting control unit stores in advance a standard value of a value obtained by subtracting the second detection result from the first detection result. The boosting control unit controls the output voltage of the boosting circuit based on smaller one of the first detection result and a result of addition of the second detection result and the standard value.

More preferably, in a case where the intake pressure of the internal combustion engine represented by the second detection result is lower than the atmospheric pressure represented by the first detection result, the boosting control unit sets a variable to be gradually decreased from the first detection result, and controls the output voltage of the boosting circuit based on a relation between the variable and a limit value of the output voltage of the boosting circuit and on the variable.

More preferably, the boosting control unit makes a failure diagnosis of the atmospheric pressure sensor and the physical amount sensor based on the first and second detection results, and when a failure of at least one of the atmospheric pressure sensor and the physical amount sensor is detected, sets the output voltage of the boosting circuit lower than when the atmospheric pressure sensor and the physical amount sensor are both normal.

According to a still further aspect, the present invention provides a vehicle, including: an atmospheric pressure sensor for detecting atmospheric pressure and for outputting the detected atmospheric pressure as a first detection result; a boosting circuit for boosting an input voltage and for providing an output voltage; a control unit for controlling the output voltage of the boosting circuit based on the first detection result; a physical amount sensor for detecting a physical amount that changes in accordance with the atmospheric pressure and for outputting the detected physical amount as a second detection result; and a diagnosis unit for making a failure diagnosis of the atmospheric pressure sensor based on the first and second detection results.

Preferably, the vehicle further includes an internal combustion engine. The physical amount sensor detects intake pressure of the internal combustion engine as the physical amount.

According to a still further aspect, the present invention provides a vehicle, including: a boosting circuit; an atmospheric pressure sensor for detecting atmospheric pressure and for outputting the detected atmospheric pressure as a first detection result; a physical amount sensor for detecting a physical amount that changes in accordance with the atmospheric pressure and for outputting the detected physical amount as a second detection result; and a boosting control unit for controlling an output voltage of the boosting circuit based on the first and second detection results.

Preferably, the vehicle further includes an internal combustion engine. The physical amount sensor detects intake pressure of the internal combustion engine as the physical amount.

According to the present invention, based on the result of detection by the atmospheric pressure sensor and the result of detection by the physical amount sensor detecting a physical amount that changes in accordance with the change in atmospheric pressure, a failure of the atmospheric pressure sensor, which is used for controlling an output voltage of the boosting circuit, is diagnosed. Therefore, reliability of the boosting system can be improved.

Further, according to the present invention, the boosting circuit is controlled based on the result of detection by the atmospheric pressure sensor and the result of detection by the physical amount sensor detecting a physical amount that changes in accordance with the change in atmospheric pressure and, therefore, reliability of the boosting system can be improved.

BEST MODES FOR CARRYING OUT THE INVENTION

Figure 1:
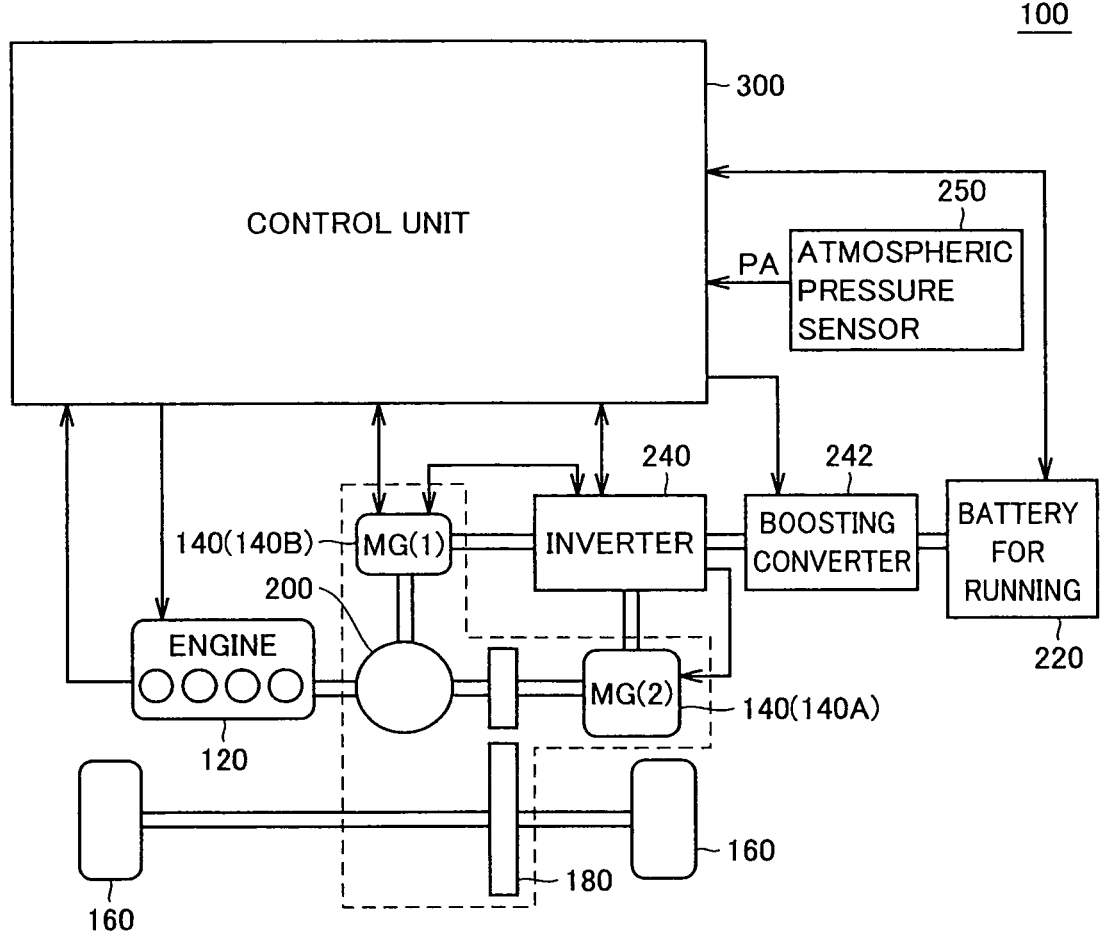
FIG. 1 is a block diagram of a hybrid vehicle according to an embodiment of the present invention.

In the following, an embodiment will be described in detail with reference to the figures. In the figures, the same or corresponding portions are denoted by the same reference characters and description thereof will not be repeated.

FIG. 1 is a block diagram of a hybrid vehicle in accordance with an embodiment of the present invention. Referring to FIG. 1, a hybrid vehicle 100 includes, as driving power sources, a combustion engine such as a gasoline engine (hereinafter simply referred to as an engine) 120 and a motor generator (MG) 140. In the following, for convenience of description, motor generator 140 may be referred to as motor 140A and generator 140B (or motor generator 140B). It is noted that depending on the state of running of hybrid vehicle 100, motor 140A may function as a generator, or generator 140B may function as a motor. When the motor generator functions as a generator, regenerative braking takes place.

When the motor generator functions as a generator, kinetic energy of the vehicle is converted to electric energy and vehicle speed decreases.

Hybrid vehicle 100 further includes reduction gears 180 and a power split device (for example, planetary gear mechanism) 200. Reduction gears 180 transmit power generated by engine 120 or motor generator 140 to driving wheels 160, and transmit drive of driving wheels 160 to engine 120 or motor generator 140. Power split device 200 splits the power generated by engine 120 to two paths, that is, to driving wheels 160 and generator 140B. Specifically, reduction gears 180 and power split device 200 transmit the driving power from at least one of the engine and the electric motor to the wheels.

Hybrid vehicle 100 further includes a battery 220 for running, and an inverter 240. Battery 220 for running charges electric power for driving motor generator 140. Inverter 240 realizes current control while converting DC voltage of battery 220 for running and AC voltage of motor 140A and generator 140B.

Hybrid vehicle 100 further includes a control unit 300 and an atmospheric pressure sensor 250. Control unit 300 manages and controls state of charge/discharge of battery 220 for running. Control unit 300 controls the hybrid system as a whole such that most efficient operation of hybrid vehicle 100 is realized, by controlling engine 120, motor generator 140, inverter 240 and battery 220 for running, in accordance with the state of hybrid vehicle 100.

In the present embodiment, between battery 220 for running and inverter 240, a boosting converter 242 is provided. This is because the rated voltage of battery 220 for running is lower than the rated voltages of motor 140A and motor generator 140B. When electric power is supplied from battery 220 for running to motor 140A or motor generator 140B, the voltage is boosted by boosting converter 242.

Atmospheric pressure sensor 250 detects atmospheric pressure at the current position of hybrid vehicle 100, and outputs atmospheric pressure PA. Based on atmospheric pressure PA, control unit 300 controls an output voltage of boosting converter 242.

In order to split the power of engine 120 to driving wheels 160 and motor generator 140B, a planetary gear mechanism (planetary gear) is used as power split device 200. By controlling number of rotations of motor generator 140B, power split device 200 also functions as a continuously variable transmission. Rotating force of engine 120 is input to a planetary carrier (C), which is transmitted by a sun gear (S) to motor generator 140B and by a ring gear (R) to the motor and to an output shaft (on the side of driving wheels 160). When rotating engine 120 is to be stopped, as the engine 120 is rotating, kinetic energy of rotation is converted to electric energy by motor generator 140B, so that the speed of engine 120 is reduced.

When engine 120 is to be started in hybrid vehicle 100, an operation of rotating a crankshaft of engine 120 is performed by generator 140B. If engine 120 has low efficiency at the time of starting or during low speed running, only the motor 140A of motor generator 140 is used for running of hybrid vehicle 100. In normal running, the power of engine 120 is divided to two paths by, for example, power split device 200. One part of the divided power directly drives driving wheels 160, and the remaining part drives generator 140B, so that generator 140B generates electric power. Motor 140A is driven by the electric power generated at this time, to assist driving of wheels 160. During high-speed running, electric power from battery 220 for running is additionally supplied to motor 140A to increase the output of motor 140A, to add driving force to driving wheels 160.

On the other hand, at the time of deceleration, motor 140A driven by driving wheels 160 functions as a generator to attain electric power regeneration, with the recovered electric power stored in battery 220 for running. If the amount of charges of battery 220 for running lowers and charging is exceptionally necessary, an output of engine 120 is increased to increase the amount of electric power generation by generator 140B, so as to increase the amount of charges to battery 220 for running.

Next, of hybrid vehicle 100, engine 120 and boosting converter 242 as portions related to the controller of boosting circuit and the boosting system failure diagnosis device will be described.

Figure 2:
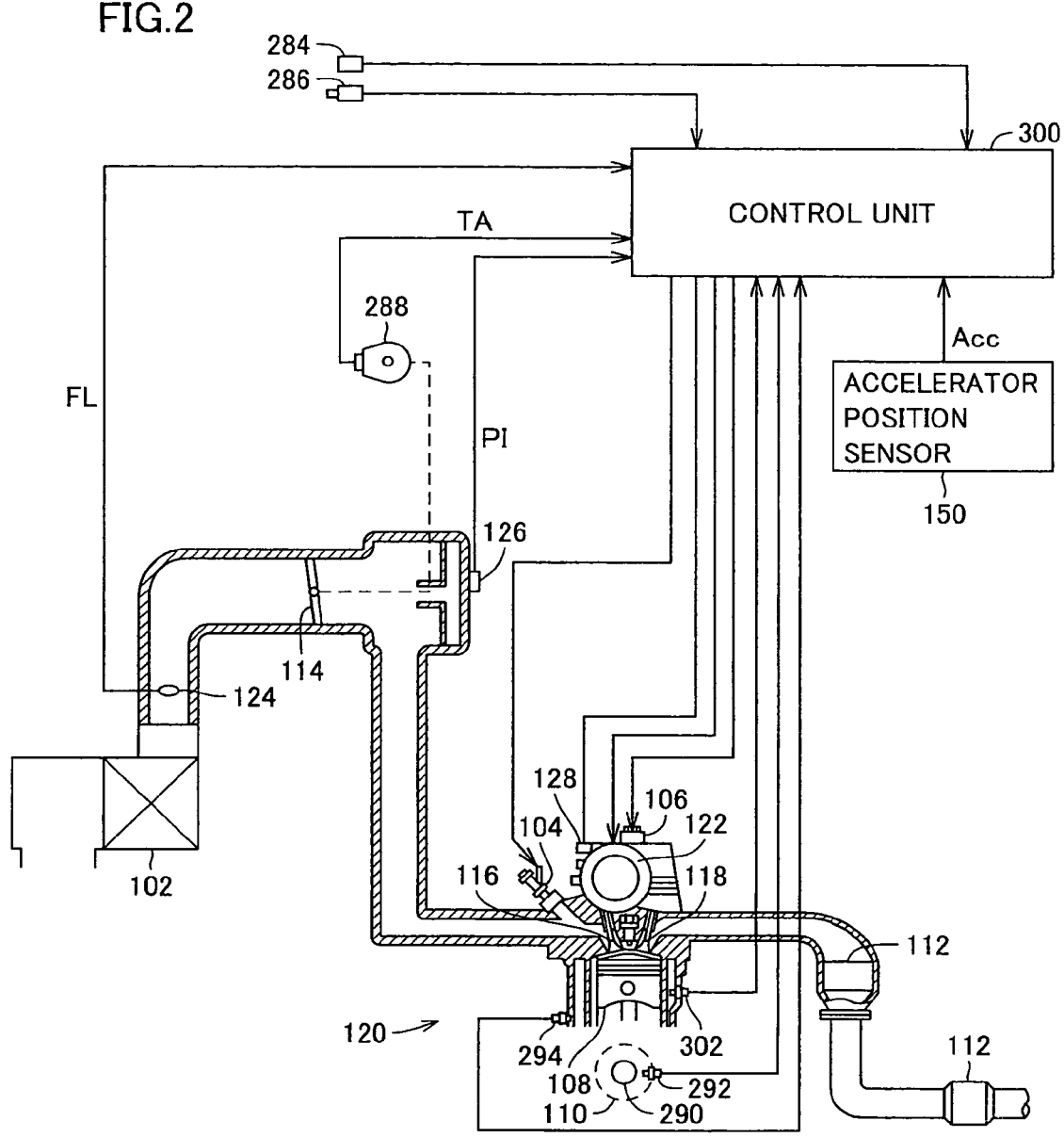
FIG. 2 shows a schematic configuration of engine 120 of FIG. 1.

FIG. 2 is a schematic diagram of engine 120 shown in FIG. 1. Referring to FIG. 2, engine 120 is an internal combustion engine, in which an air-fuel mixture of air taken from an air cleaner 102 and fuel injected by an injector 104 is ignited by an ignition plug 106 and burned in a combustion chamber.

When the air-fuel mixture burns, a piston 108 is pressed by combustion pressure, and crankshaft 110 rotates. The air-fuel mixture after combustion (exhaust gas) is cleaned by a ternary catalyst 112 and thereafter exhausted to the outside of the vehicle. The amount of air taken into engine 120 is adjusted by a throttle valve 114.

When crankshaft 110 rotates, camshafts (not shown) on the intake side and exhaust side, which are coupled by a chain, belt or the like, are caused to rotate. Then, because of the rotations of intake side and exhaust side camshafts, an intake valve 116 and an exhaust valve 118 provided at upper portions of cylinders of engine 120 are opened/closed. When exhaust valve 118 opens, the exhaust gas after combustion in the cylinders is discharged to the outside. When intake valve 116 opens, air-fuel mixture flows into the cylinders.

On the intake side camshaft of engine 120, a valve timing varying mechanism 122 is further provided. A valve timing varying mechanism may also be provided on the exhaust side camshaft. Valve timing varying mechanism 122 is a mechanism that varies the timing of opening/closing intake valve 116.

To control unit 300, connected are an air flow meter 124, an intake pressure sensor 126, a cam position sensor 128, a knock sensor 294, a water temperature sensor 302, a crank position sensor 292 provided opposite to a timing rotor 290, a throttle opening position sensor 288, a vehicle speed sensor 284, and an ignition switch 286.

Air flow meter 124 detects an amount of intake air FL and transmits the result of detection to control unit 300. Intake pressure sensor 126 detects intake pressure PI in intake manifold, and transmits the result of detection to control unit 300. Intake pressure PI changes in accordance with a change in atmospheric pressure PA.

Knock sensor 294 is formed of a piezoelectric device. Knock sensor 294 generates a voltage as engine 120 vibrates. The voltage has a magnitude corresponding to the magnitude of vibration. Knock sensor 294 transmits a signal indicating the voltage to controller 300.

Water temperature sensor 302 detects a temperature of cooling water in a water jacket of engine 120, and transmits a signal indicating the result of detection to control unit 300.

Timing rotor 290 is provided on crankshaft 110, and rotates together with crankshaft 110. On an outer circumference of timing rotor 290, a plurality of projections are provided at a predetermined interval. Crank position sensor 292 is provided opposite to the projections of timing rotor 290. When timing rotor 290 rotates, air-gap between the projection on timing rotor 290 and crank position sensor 292 changes, and hence, magnetic flux passing through a coil portion of crank position sensor 292 changes, generating electromotive force at the coil portion. Crank position sensor 292 transmits a signal indicating the electromotive force to control unit 300. Control unit 300 calculates engine speed Ne based on the signal transmitted from crank position sensor 292. Cam position sensor 128 has a structure similar to that of crank position sensor 292, and by a timing rotor fixed on intake camshaft on left and right banks, detects an actual camshaft position.

Throttle opening position sensor 288 detects throttle opening position TA and transmits the result of detection to control unit 300. Vehicle speed sensor 284 detects number of rotations of a wheel (not shown) and transmits a signal indicating the result of detection to control unit 300. Control unit 300 calculates vehicle speed from the number of rotations of the wheel. Ignition switch 286 is turned on by a driver when engine 120 is to be started.

Accelerator pedal position sensor 150 detects an amount of stepping of accelerator pedal by the driver, and transmits a signal Acc indicating the accelerator pedal position to control unit 300. Control unit 300 performs calculations based on the signals transmitted from various sensors and ignition switch 286, a map and a program stored in a memory (not shown) in control unit 300, and controls equipment such that engine 120 attains to a desired state of operation.

Figure 3:
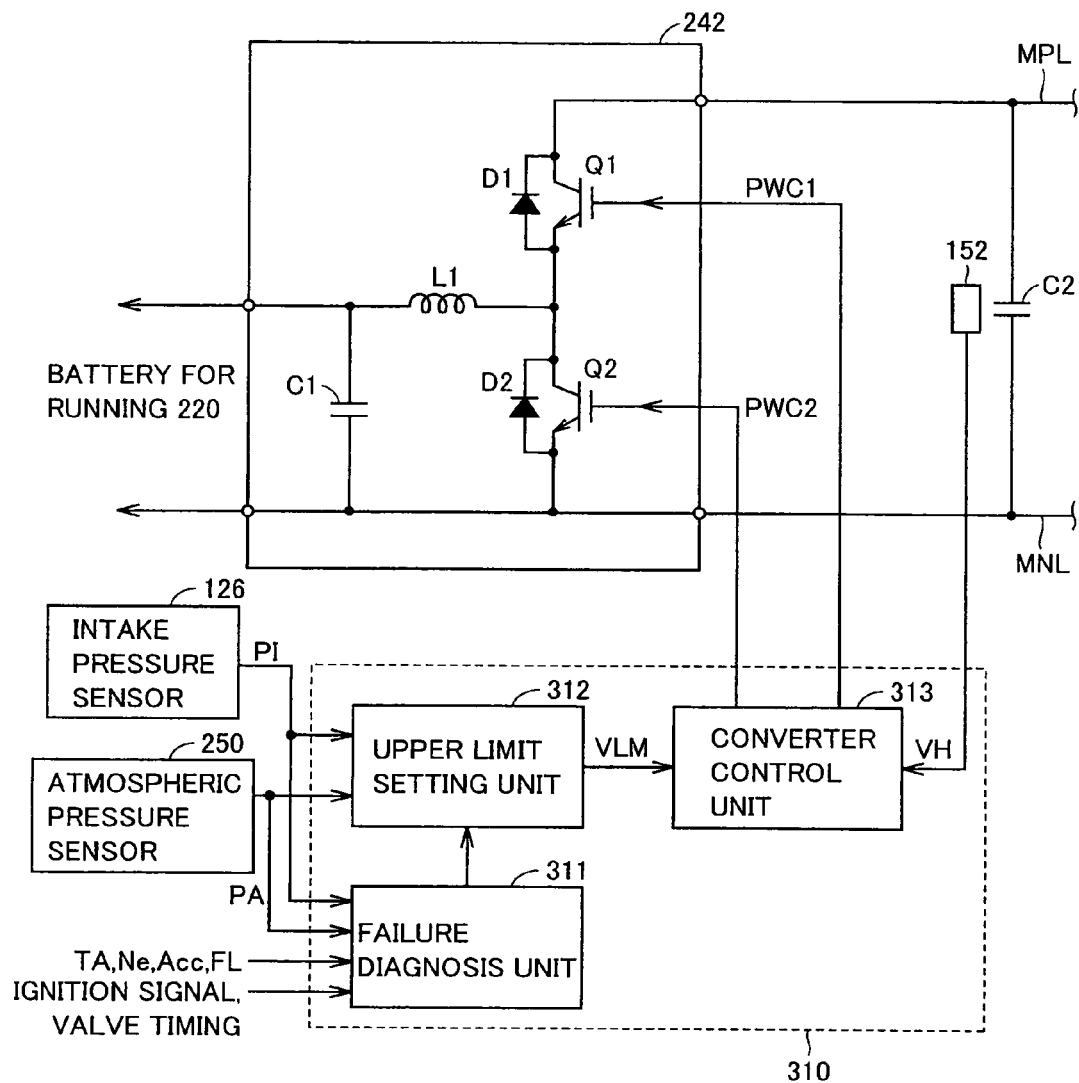
FIG. 3 illustrates configurations of a boosting converter 242 and a boosting control unit 310 included in a control unit 300.

FIG. 3 shows a configuration of boosting converter 242 and a configuration of boosting control unit 310 included in control unit 300. Referring to FIG. 3, boosting control unit 310 controls boosting converter 242. Boosting control unit 310 includes a failure diagnosis unit 311, an upper limit setting unit 312 and a converter control unit 313.

Atmospheric pressure sensor 250, boosting converter 242, upper limit setting unit 312 and converter control unit 313 constitute the "boosting system" of the present invention. Failure diagnosis unit 311 corresponds to the "diagnosis unit" of the present invention. Upper limit setting unit 312 and converter control unit 313 constitute the "control unit" included in the boosting system in the present invention.

Boosting converter 242 includes a smoothing capacitor C1, a reactor L1, IGBT (Insulated Gate Bipolar Transistor) elements Q1 and Q2, and diodes D1 and D2.

Opposite ends of smoothing capacitor C1 are connected to a positive electrode and a negative electrode of battery 220 for running, respectively. One end of reactor L1 is connected to one end of smoothing capacitor C1, and the other end of reactor L1 is connected to the emitter of IGBT element Q1 and the collector of IGBT element Q2. Diode D1 has its cathode connected to the collector of IGBT element Q1, and its anode connected to the emitter of IGBT element Q1. Diode D2 has its cathode connected to the collector of IGBT element Q2, and its anode connected to the emitter of IGBT element Q2. IGBT element Q1 has its collector connected to a positive main line MPL, and IGBT element Q2 has its emitter connected to a negative main line MNL.

Between positive main line MPL and negative main line MNL, a smoothing capacitor C2 is connected. A voltage sensor 152 detects a voltage VH across opposite ends of smoothing capacitor C2.

Failure diagnosis unit 311 makes a failure diagnosis of atmospheric pressure sensor 250, based on the atmospheric pressure PA detected by atmospheric pressure sensor 250 and intake pressure PI detected by intake pressure sensor 126, when engine 120 is stopped. When engine 120 is in operation, failure diagnosis unit 311 makes a failure diagnosis of atmospheric pressure sensor 250 using not only the atmospheric pressure PA and intake pressure PI but also throttle opening position TA detected by throttle opening position sensor 288, engine speed Ne, the signal Acc from accelerator pedal position sensor 150, intake air amount FL detected by air flow meter 124, an ignition signal of control unit 300 for controlling ignition plug 106, and a control signal of control unit 300 for controlling valve timing. The result of diagnosis by failure diagnosis unit 311 is transmitted to upper limit setting unit 312.

Upper limit setting unit 312 sets an upper limit value VLM of output voltage (voltage VH) of boosting converter 242, based on atmospheric pressure PA, intake pressure PI and the result of diagnosis by failure diagnosis unit 311. If failure diagnosis unit 311 makes a diagnosis that atmospheric pressure 250 is normal, upper limit setting unit 312 sets an upper limit value VLM in accordance with the atmospheric pressure PA. Inter-phase dielectric resistance of the motor generator lowers as the atmospheric pressure decreases and, therefore, boosting control unit 310 lowers the upper limit value VLM. Thus, it becomes possible to ensure power performance of hybrid vehicle 100 at flats and to protect motor generator at high altitude.

Further, as failure diagnosis unit 311 makes a failure diagnosis of atmospheric pressure sensor 250 using an output of intake pressure sensor 126, reliability of output from atmospheric pressure sensor 250 increases, and more appropriate control of output voltage from boosting converter 242 becomes possible. Therefore, by the present embodiment, reliability of the boosting system can be improved.

If failure diagnosis unit 311 makes a diagnosis that atmospheric pressure sensor 250 is abnormal, upper limit setting unit 312 sets the upper limit value VLM to the lowest value in a predetermined range. The value is determined in consideration of atmospheric pressure at the highest altitude where vehicle running is possible and the breakdown voltage of motor generator at that atmospheric pressure. Thus, even when atmospheric pressure sensor 250 fails, operation of motor generator can be continued and, therefore, influence on the running of hybrid vehicle 100 can be reduced.

In the present embodiment, whether atmospheric pressure sensor 250 is abnormal or not is determined by a comparison between the output of atmospheric pressure sensor 250 and intake pressure sensor 126. In the present embodiment, if either one of atmospheric pressure sensor 250 and intake pressure sensor 126 fails, it is assumed that the atmospheric pressure sensor is failed and boosting converter 242 is controlled accordingly, without specifying which of the sensors failed.

Converter control unit 313 generates signals PWC1 and PWC2 based on the upper limit value VLM and voltage VH, and outputs signals PWC1 and PWC2 to IGBT elements Q1 and Q2, respectively. Converter control unit 313 controls IGBT elements Q1 and Q2 such that the value of voltage VH does not exceed the upper limit value VLM.

When boosting converter 242 is to be operated as a boosting circuit, converter control unit 313 turns on/off IGBT element Q2 while maintaining IGBT element Q1 off. When IGBT element Q2 is on, a path is formed through which current flows from the positive electrode of battery 220 for running through reactor L1 and IGBT element Q2 to the negative electrode of battery 220 for running. While the current is flowing, energy is accumulated in reactor L1. When IGBT element Q2 is turned off, the energy accumulated in reactor L1 flows to inverter 240 through diode D1. Therefore, the voltage between electrodes of smoothing capacitor C2 increases. Therefore, the output voltage of boosting converter 242 applied to inverter 240 is boosted.

When boosting converter 242 is to be operated as a voltage lowering circuit, converter control unit 313 turns on/off IGBT element Q1 while maintaining IGBT element Q2 off. When IGBT element Q1 is on, the current regenerated by inverter 240 flows to IGBT element Q1, reactor L1 and to battery 220 for running.

Figure 4:
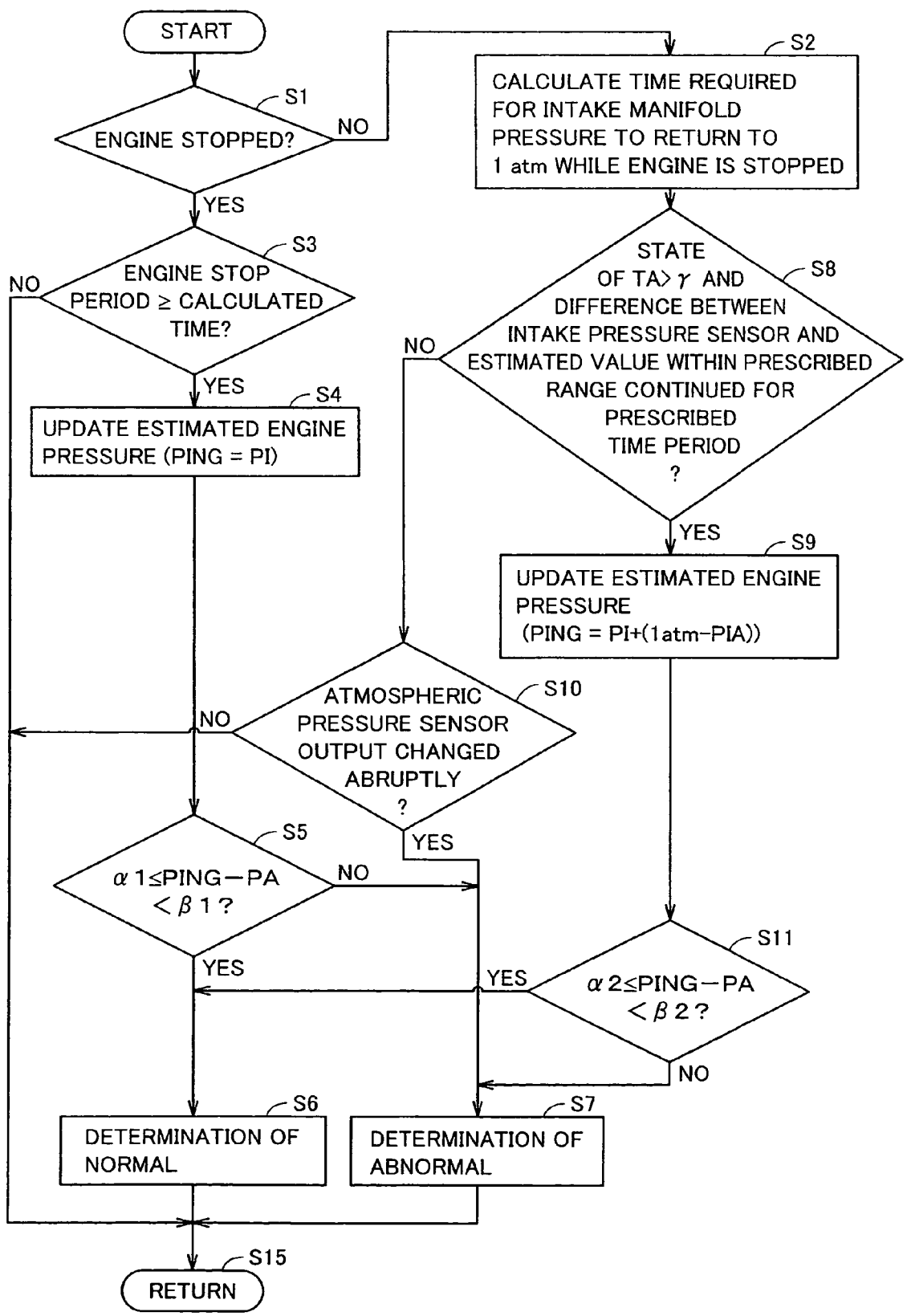
FIG. 4 is a flowchart representing a failure diagnosis process executed by a failure diagnosis unit 311 shown in FIG. 3.

FIG. 4 is a flowchart representing the process of failure diagnosis executed by failure diagnosis unit 311 shown in FIG. 3. Referring to FIGS. 4 and 3, failure diagnosis unit 311 determines whether engine 120 is stopped or not (step S1). Failure diagnosis unit 311 calculates engine speed Ne of engine 120 based, for example, on the signal from crank position sensor 292, and based on the result of calculation, determines whether engine 120 is stopped or not.

When engine 120 is not stopped (NO at step S1), failure diagnosis unit 311 calculates a time period in which the pressure of intake manifold returns to substantially 1 atm, while engine 120 is stopped (step S2). At step S2, failure diagnosis unit 311 finds the pressure of intake manifold, based on the state of operation of engine 120 (load factor of engine 120 and throttle opening position) and on a map in which relation between the intake manifold pressure and the engine operation state is determined. The map defines the relation among the load factor, the throttle opening position and the negative pressure of intake manifold determined by experiments under 1 atm, and failure diagnosis unit 311 stores the map. As the negative pressure immediately before engine stop is smaller (load factor is larger) and throttle opening position is larger, the time period in which the pressure of intake manifold returns substantially 1 atm is set shorter.

When engine 120 is stopped (YES at step S1), failure diagnosis unit 311 determines whether the engine stop period is equal to or longer than the time period calculated at step S2. If the engine stop period is shorter than the calculated time period (NO at step S3), the process proceeds to step S15. If the engine stop period is equal to or longer than the time period calculated at step S2 (YES at step S3), failure diagnosis unit 311 updates an estimated engine pressure PING (step S4). The estimated engine pressure PING is calculated to be compared with the atmospheric pressure PA as the result of detection of atmospheric pressure sensor 250. At step S4, failure diagnosis unit 311 sets the intake pressure PI detected by intake pressure sensor 126 to be the estimated engine pressure PING.

At step S5, failure diagnosis unit 311 determines whether difference between estimated engine pressure PING and atmospheric pressure PA detected by atmospheric pressure sensor 250 is equal to or larger than $\alpha 1$ and smaller than $\beta 1$. Values $\alpha 1$ and $\beta 1$ are determined beforehand. If it is YES at step S3, it follows that the intake pressure is substantially equal to the atmospheric pressure and, therefore, the difference between estimated engine pressure PING and atmospheric pressure PA becomes close to 0, if atmospheric pressure sensor 250 and intake pressure sensor 126 are both normal. By starting diagnosis of atmospheric pressure sensor 250 after the intake pressure of engine 120 becomes substantially equal to the atmospheric pressure, accurate diagnosis becomes possible. Further, by calculating the time period in which the pressure of intake manifold returns to substantially 1 atm in accordance with the state of engine operation, more accurate diagnosis becomes possible.

Figure 5:
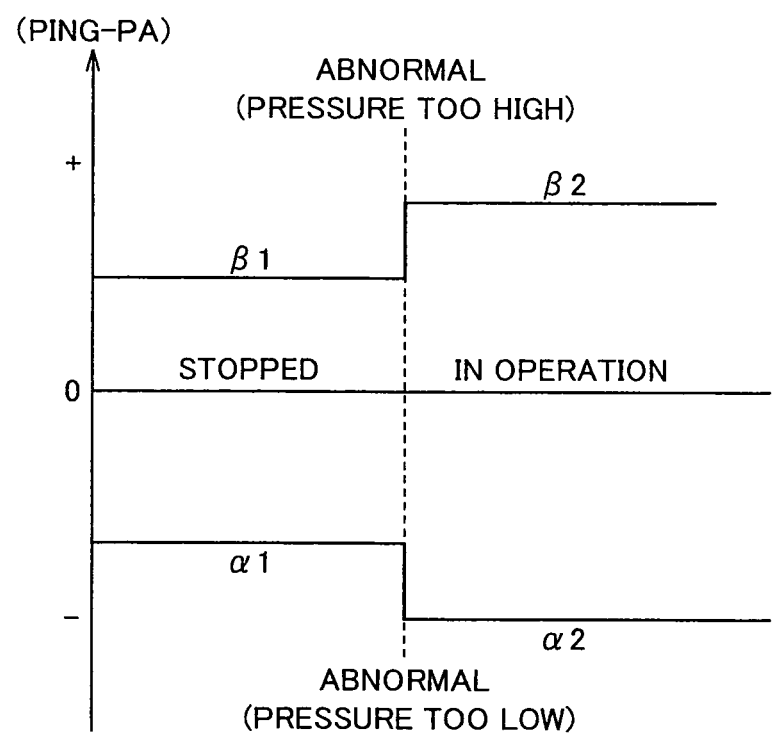
FIG. 5 illustrates a failure diagnosis process for an atmospheric pressure sensor based on pressure difference (PING−PA).

FIG. 5 illustrates the failure diagnosis process for atmospheric pressure sensor 250 based on the pressure difference (PING–PA). Referring to FIGS. 5 and 4, if (PING–PA) is in a range equal to or larger than $\alpha 1$ and smaller than $\beta 1$ (YES at step S5), atmospheric pressure sensor 250 is determined to be normal (step S6). If pressure difference (PING–PA) is smaller than $\alpha 1$, it means that intake pressure PI is lower than atmospheric pressure PA (pressure too low), and if pressure difference (PING–PA) is equal to or larger than $\beta 1$, it means that intake pressure PI is higher than atmospheric pressure PA (pressure too high). Both states indicate a failure of atmospheric pressure sensor 250. If pressure difference (PING–PA) is smaller than $\alpha 1$ or it is equal to or larger than $\beta 1$, atmospheric pressure sensor 250 is determined to be abnormal (step S7).

Next, the failure diagnosis process for atmospheric pressure sensor 250 when the engine is in operation will be described. At step S8 following step S2, failure diagnosis unit 311 determines whether a state in which throttle opening position TA is larger than a prescribed value $\gamma$ and the difference between the value of intake pressure sensor (PI) and the estimated intake pressure is within a prescribed range has been continued for a prescribed time period or not. The determination conditions at step S8 are determined in advance as conditions required for the intake pressure to be stable during the operation of engine 120. As the failure diagnosis of atmospheric pressure sensor is made when such conditions are satisfied, failure diagnosis of atmospheric pressure sensor can be executed while the engine is operating.

Figure 6:
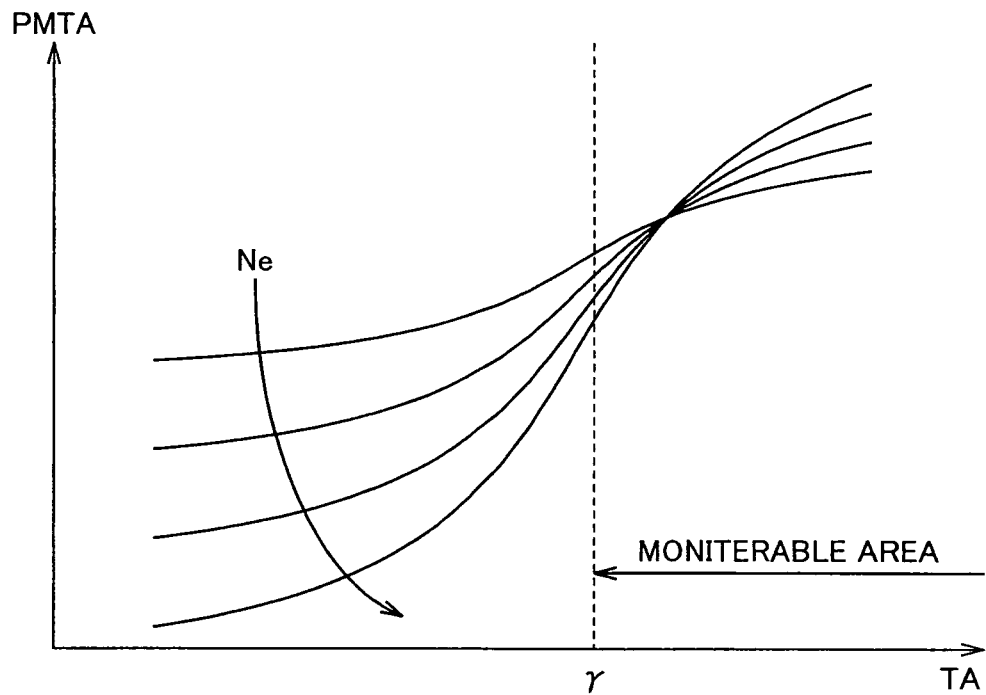
FIG. 6 shows a relation between a throttle opening position TA and an estimated intake pressure PMTA.

FIG. 6 shows a relation between throttle opening position TA and estimated intake pressure PMTA. Referring to FIG. 6, the plurality of curves represent relations between throttle opening position TA and estimated intake pressure PMTA with engine speed Ne varied. The relations are determined, for example, by experimental results.

If throttle opening position TA is equal to or smaller than $\gamma$, the intake pressure significantly changes as throttle opening position TA changes, and intake pressure much differs when engine pressure Ne is different. If throttle opening position TA is larger than $\gamma$, the change in intake pressure with the change in throttle opening position TA becomes smaller, and the variation in intake pressure related to engine speed Ne becomes smaller. The range where throttle opening position TA is larger than $\gamma$ is the range in which the estimated value of intake pressure can be used for a failure diagnosis of the atmospheric pressure sensor.

Figure 7:
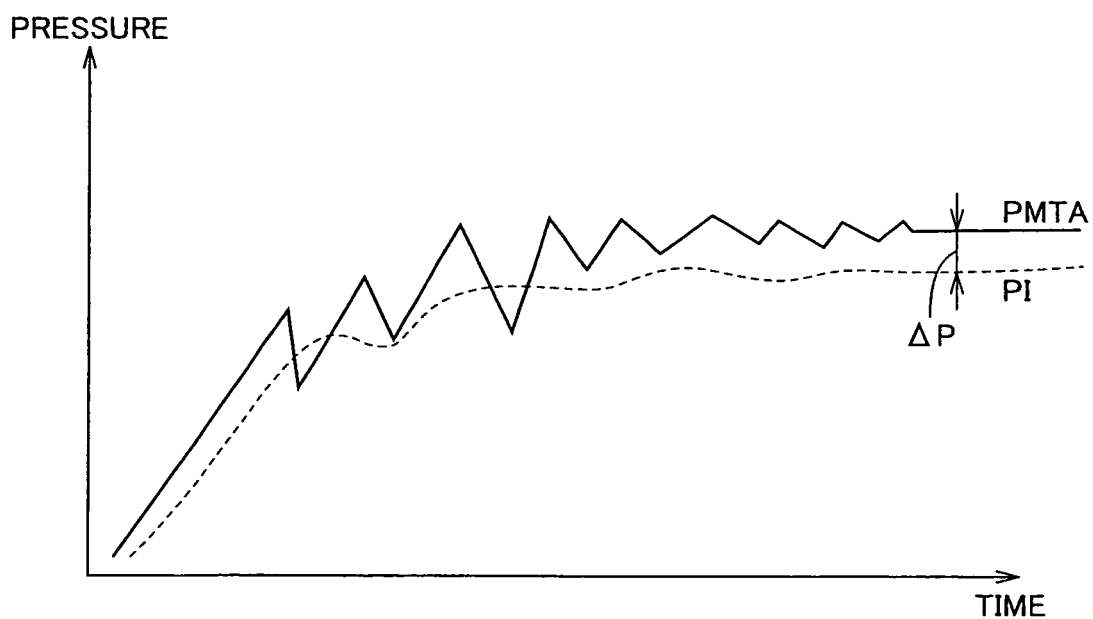
FIG. 7 shows time-change of estimated value PMTA and intake pressure PI.

FIG. 7 shows time-change of estimated value PMTA and intake pressure PI. Referring to FIG. 7, estimated value PMTA is updated at every prescribed time period. Estimated value PMTA varies significantly at the start of estimation, while it becomes stable as time passes. The intake pressure detected by intake pressure sensor 126 also varies significantly at the start of measurement, while it becomes stable as time passes. In a state in which both the estimated value PMTA and the intake pressure PI are stable, the estimated value PMTA and the intake pressure PI change keeping a difference $\Delta P$ therebetween.

Figure 8:
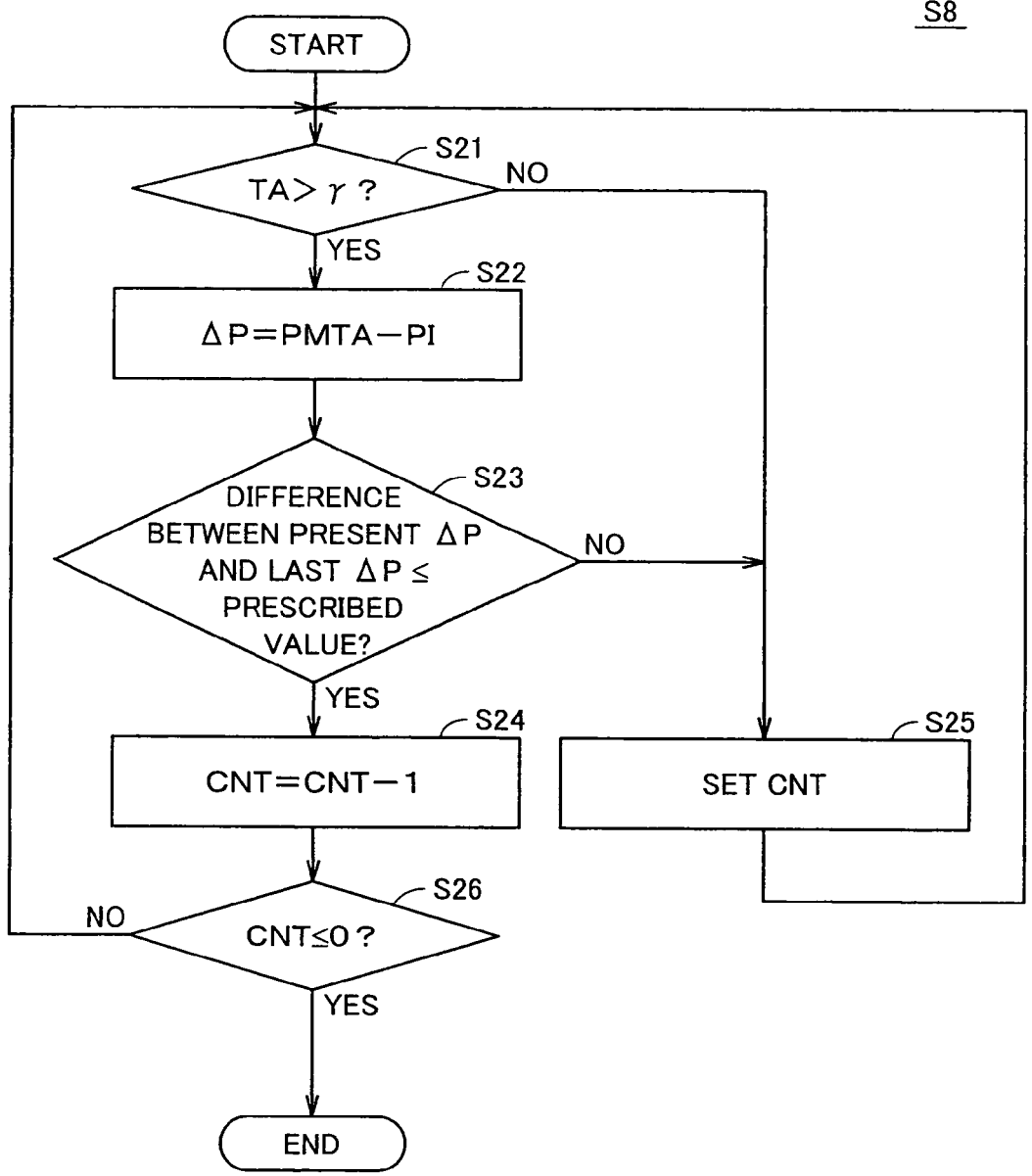
FIG. 8 is a flowchart showing details of the process at step S8 of FIG. 4.

FIG. 8 is a flowchart showing details of the process at step S8 of FIG. 4. Referring to FIG. 8, failure diagnosis unit 311 determines whether or not the throttle opening position TA is larger than $\gamma$ (step S21). If the throttle opening position TA is equal to or smaller than $\gamma$ (NO ate step S21), failure diagnosis unit 311 sets a count value CNT (step S25), and the overall process returns to step S21. The count value CNT set at step S25 is a fixed value.

If throttle opening position TA is larger than $\gamma$ (YES at step S21), failure diagnosis unit 311 calculates pressure difference $\Delta P$ between the estimated value PMTA and the intake pressure PI (actually measured value) (step S22). After calculating pressure difference $\Delta P$, failure diagnosis unit 311 determines whether an absolute value between the pressure difference $\Delta P$ calculated this time (present $\Delta P$) and the pressure difference $\Delta P$ calculated last time (last $\Delta P$) is equal to or smaller than a prescribed value (step S23). If the absolute value of difference between the present $\Delta P$ and the last $\Delta P$ is equal to or smaller than the prescribed value (YES at step S23), it means that the estimated value PMTA and the intake pressure PI are both stable. In that case, failure diagnosis unit 311 decreases by 1 the count value CNT (step S24). When the process of step S24 ends, failure diagnosis unit 311 determines whether the count value CNT is equal to or smaller than 0 (step S26).

If the count value CNT is larger than 0 (NO at step S26), the process returns to step S21. If the count value CNT is equal to or smaller than 0 (YES at step S26), the overall process ends. If the count value CNT is equal to or smaller than 0, it means that a prescribed time period has passed with the estimated value PMTA and the intake pressure PI being in stable states. Specifically, the process of step S8 ends if a state in which the throttle opening position TA is larger than γ and the change in pressure difference ΔP (difference between the present ΔP and the last ΔP) is equal to or smaller than the prescribed value (a state in which pressure difference ΔP is constant) continued for a prescribed time period.

If the difference between the present ΔP and the last ΔP is larger than the prescribed value (NO at step S23), failure diagnosis unit 311 sets a predetermined count value CNT (step S25).

Again referring to FIGS. 4 and 3, at step S8, if the state in which throttle opening position TA is larger than the prescribed value γ and the difference between the value of intake pressure sensor 126 (intake pressure PI) and the estimated intake pressure is within a prescribed range is continued for a prescribed time period (YES at step S8), failure diagnosis unit 311 updates the estimated engine pressure PING (step S9).

Failure diagnosis unit 311 stores in advance a theoretical value of intake air determined based on the state of operation of engine 120 under 1 atmospheric pressure. Information representing the state of operation of engine 120 includes engine speed Ne, accelerator pedal position represented by signal Acc, an ignition timing represented by the ignition signal transmitted from control unit 300 to ignition plug 106, and a valve timing. Failure diagnosis unit 311 corrects the estimated engine pressure PING using the intake air amount FL from air flow meter 124 and the theoretical value of intake air.

Specifically, from the intake air amount FL and the theoretical value of intake air, failure diagnosis unit 311 calculates a difference between the value of intake pressure sensor 126 (intake pressure PI) and the intake pressure PIA (theoretical value) when engine 120 operates under 1 atmospheric pressure, and calculates the estimated engine pressure PING by adding the difference to 1 atmospheric pressure. Namely, the estimated engine pressure PING is calculated in accordance with Equation (1) below.

$$PING = 1 \text{ atm} + (PI - PIA) \quad (1)$$

The estimated engine pressure PING represented by Equation (1) will be described in greater detail.

Figure 9:
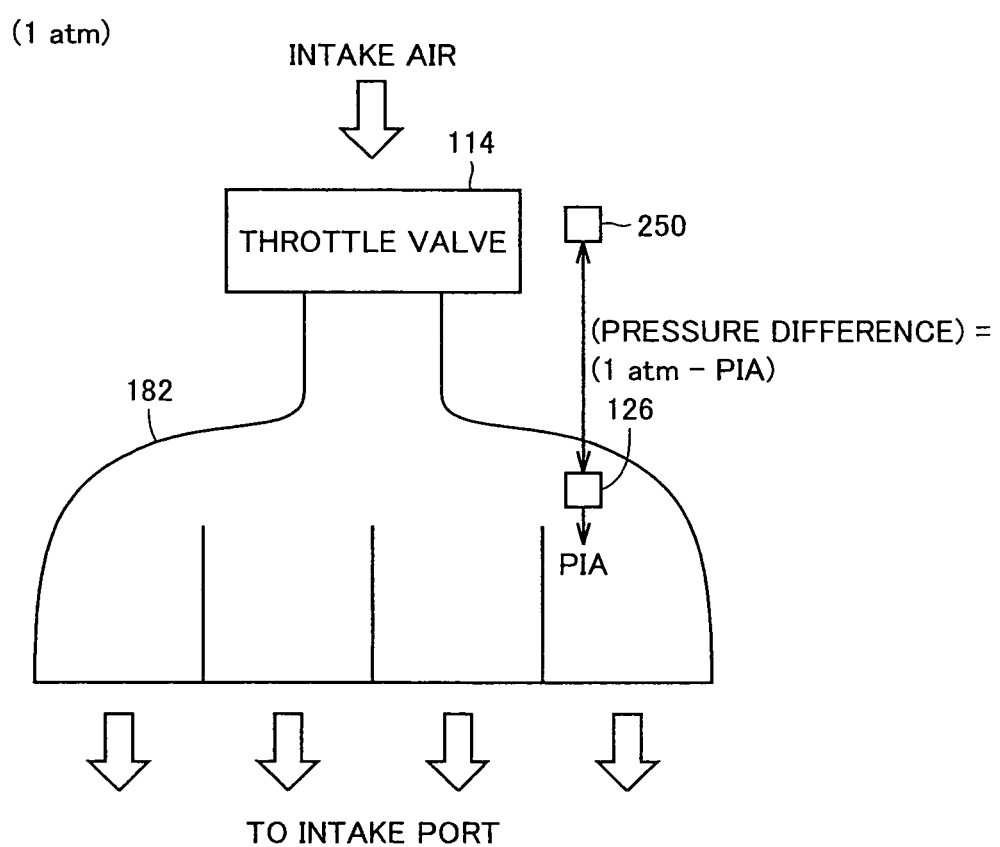
FIG. 9 is an illustration related to the equation for calculating estimated engine pressure PING at step S9 of FIG. 4.

FIG. 9 illustrates the equation for calculating the estimated engine pressure PING at step S9 of FIG. 4. Referring to FIG. 9, the intake air flows through throttle valve 114, intake manifold 182 to the intake port. Assuming that the pressure outside the intake manifold 182 is 1 atm and the pressure inside the intake manifold is intake pressure PIA, the pressure difference would be (1 atm−PIA).

In the present embodiment, it is assumed that even when the intake pressure of intake manifold 182 changes, the difference between the intake pressure inside intake manifold 182 and the atmospheric pressure is always kept at (1 atm−PIA). Therefore, when the atmospheric pressure varies from 1 atm, the estimated engine pressure PING can be calculated in accordance with Equation (1).

Referring to FIGS. 4 and 5, at step S11, failure diagnosis unit 311 (FIG. 3) determines whether the difference between estimated engine pressure PING and the atmospheric pressure PA detected by atmospheric pressure sensor 250 is equal to or larger than α2 and smaller than β2. The values α2 and β2 are determined in the similar manner as α1 and β1. As shown in FIG. 5, the tolerable range of pressure difference (PING−PA) while the engine is in operation is wider than the tolerable range of pressure difference (PING−PA) while the engine is stopped. Though intake pressure PI tends to vary while the engine is in operation, erroneous determination at the time of failure diagnosis of atmospheric pressure sensor 250 can be prevented by widening the tolerable range of pressure difference (PING−PA) to be larger than the tolerable range when the engine is stopped.

If (PING−PA) is equal to or larger than α2 and smaller than β2 (YES at step S11), failure diagnosis unit 311 determines that atmospheric pressure sensor 250 is normal (step S6). If (PING−PA) is smaller than α2 or (PING−PA) is equal to or larger than β2 (NO at step S11), failure diagnosis unit 311 determines that atmospheric pressure sensor 250 is abnormal (step S7).

It is noted that the absolute value of β1 is smaller than the absolute value of α1, and the absolute value of β2 is smaller than the absolute value of α2. If atmospheric pressure sensor 250 is abnormal and the upper limit value VLM is set using estimated engine pressure PING in place of atmospheric pressure PA, there is a possibility that a voltage exceeding the breakdown voltage of motor generator is applied to the motor generator, since the upper limit value VLM increases as β1 becomes larger. By making the absolute value of β1 smaller than the absolute value of α1, it becomes possible to lower the possibility of malfunction of the motor generator. The same applies when β2 is made larger.

If the conditions that a state in which throttle opening position TA is larger than the prescribed value γ and the difference between intake pressure PI and the estimated value PMTA is within a prescribed range is continued for a prescribed time period are not satisfied at step S8 (NO at step S8), failure diagnosis unit 311 determines whether or not the output of atmospheric pressure sensor 250 has abruptly changed (the output of atmospheric pressure sensor 250 has changed discontinuously with time) (step S10). While the vehicle is used in a normal manner, possibility of abrupt change in pressure outside the vehicle is considered low. If the output of atmospheric pressure sensor 250 has changed abruptly (YES at step S10), failure diagnosis unit 311 determines that the atmospheric pressure sensor is abnormal (step S7). If the output of atmospheric pressure sensor 250 has not abruptly changed (NO at step S10), the process proceeds to step S15.

Next, the process by upper limit setting unit 312 will be described.

Figure 10:
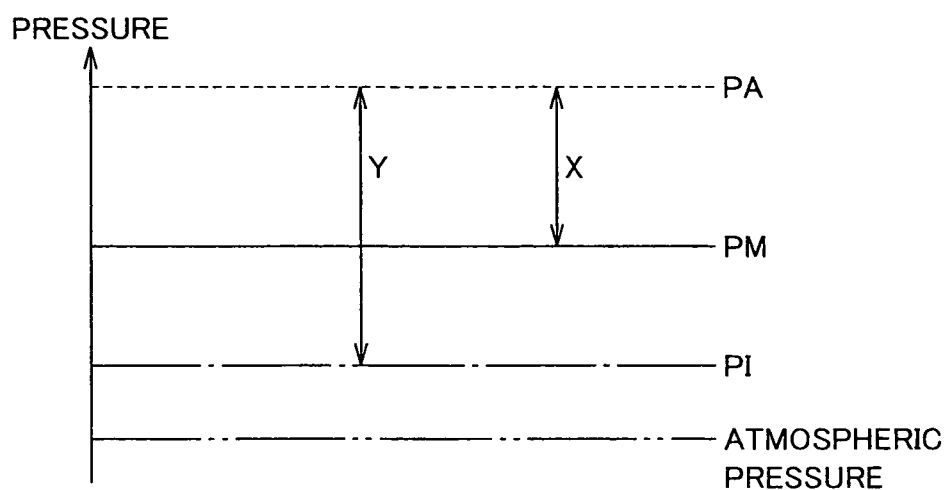
FIG. 10 shows a relation among pressure PM in motor generator when the engine is stopped, atmospheric pressure PA and intake pressure PI.

FIG. 10 shows a relation among the pressure PM inside the motor generator, atmospheric pressure PA and intake pressure PI, when the engine is stopped. The relation shown in FIG. 10 is found, for example, by experiments in an ideal environment (for example, at 1 atm). Referring to FIG. 10, pressure PM represents the estimated pressure inside the motor generator. The pressure PM is lower by X than atmospheric pressure PA. Further, intake pressure PI is lower by Y than atmospheric pressure PA. Specifically, pressure PM equals to (PI+Y−X).

In FIG. 10, atmospheric pressure PA is shown to be higher than the actual atmospheric pressure. The relation between the atmospheric pressure detected by atmospheric pressure sensor 250 and the actual atmospheric pressure, however, is not limited to that shown in FIG. 10.

Insulation characteristics of motor generator are determined by the pressure inside the motor generator. It is noted, however, that the pressure inside the motor generator deviates from the value in the ideal state, depending on the position where atmospheric pressure sensor 250 is mounted or airtightness of the motor generator. In the present embodiment, the pressure PM inside the motor generator is calculated from atmospheric pressure PA and intake pressure PI, and boosting converter 242 is controlled based on the result of calculation.

Figure 11:
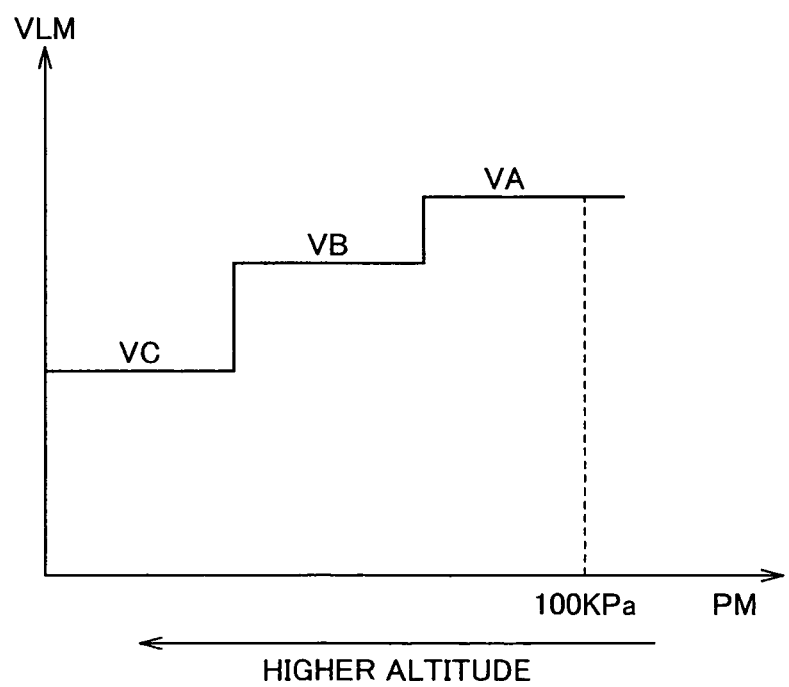
FIG. 11 shows a relation between an upper limit value VLM of an output of boosting converter 24 and pressure PM of motor generator.

FIG. 11 shows a relation between the upper limit value VLM of the output of boosting converter 242 and the pressure PM of motor generator. Referring to FIG. 11, the upper limit value VLM lowers stepwise in the order of VA, VB and VC as the pressure PM of motor generator lowers (in other words, as the altitude becomes higher). For example, when the pressure PM is 100 KPa, the upper limit value VLM is VA.

When atmospheric pressure sensor 250 and intake pressure sensor 126 are normal, upper limit setting unit 312 calculates pressure PM using as a reference lower one of PA detected by atmospheric pressure sensor 250 and a reference value (=PI+Y) obtained by adding pressure difference Y mentioned above to the intake pressure PI detected by intake pressure sensor 126, and determines the upper limit value VLM based on the result of calculation.

More specific description will be given with reference to FIG. 10. In the ideal state, pressure PM equals to (PI+Y−X) and to (PA−X). When atmospheric pressure PA varies or intake pressure PI varies, the values (PI+Y−X) and (PA−X) may be different from each other. Therefore, upper limit setting unit 312 uses either (PI+Y−X) or (PA−X), which is lower, as pressure PM. In other words, upper limit setting unit 312 selects lower one of the reference value (=PI+Y) and the atmospheric pressure PA, and by reducing X from the value, calculates the pressure PM. Then, upper limit setting unit 312 sets the upper limit value VLM based on the pressure PM. As the lower one of (PI+Y−X) and (PA−X) is set as the pressure PM, the possibility that the voltage exceeding the breakdown voltage of motor generator is applied to the motor generator can further be reduced.

If the atmospheric pressure sensor or the intake pressure sensor should fail, upper limit setting unit 312 fixes the upper limit value VLM to the lowest value (voltage value VC) in the predetermined range.

Figure 12:
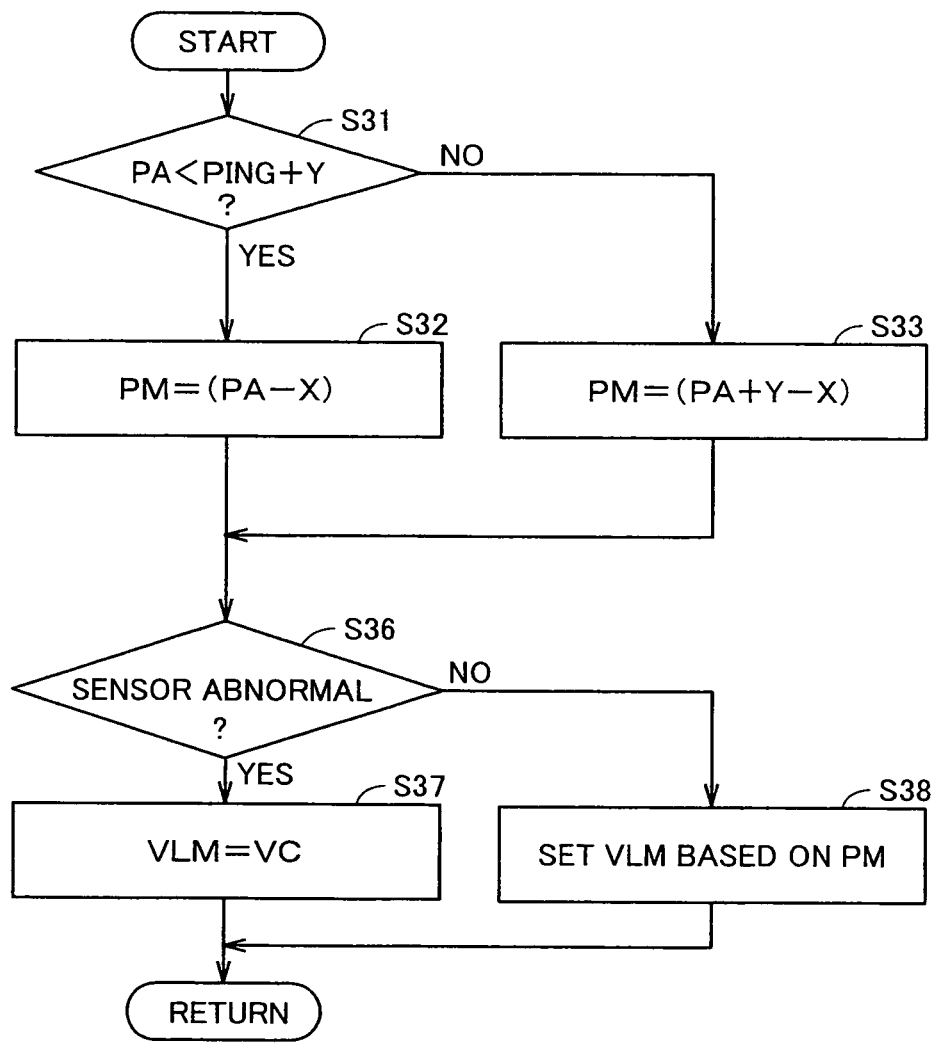
FIG. 12 is a flowchart representing a process by an upper limit setting unit 312.

FIG. 12 is a flowchart representing the process by upper limit setting unit 312. Referring to FIG. 12, upper limit setting unit 312 determines whether or not atmospheric pressure PA is smaller than the sum of estimated engine pressure PING and the pressure difference Y (PING+Y) (step S31). Here, the estimated engine pressure PING varies as the engine starts. If atmospheric pressure PA is smaller than (PING+Y) (YES at step 31), upper limit setting unit 312 calculates the pressure PM of motor generator in accordance with Equation (2) below (step S32).

$$PM=(PA-X) \qquad (2)$$

If atmospheric pressure PA is equal to or larger than (PING+Y) (NO at step S31), upper limit setting unit 312 calculates the pressure PM of motor generator in accordance with Equation (3) below (step S33).

$$PM=(PA+Y-X) \qquad (3)$$

After the process of step S32 (or step S33), upper limit setting unit 312 determines whether or not the atmospheric pressure sensor is abnormal, based on the result of diagnosis by failure diagnosis unit 311 (step S36). If atmospheric pressure sensor 250 is abnormal (YES at step S36), upper limit setting unit 312 sets the upper limit VLM to the lowest value (VC) (step S37). If atmospheric pressure sensor 250 is normal (NO at step S36), upper limit setting unit 312 sets the upper limit value VLM based on the calculated pressure PM of motor generator (step S38). When the process of step S37 (or step S38) ends, the overall process returns to step S31.

MODIFICATION

Figure 13:
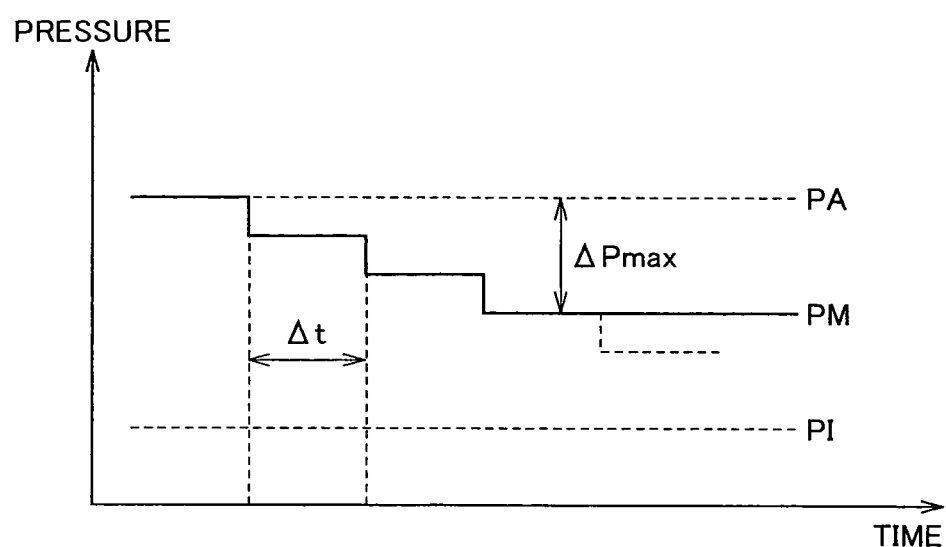
FIG. 13 shows a process of calculating pressure PM in a modification.

FIG. 13 shows a process of calculating the pressure PM in accordance with a modification. Referring to FIG. 13, in the modification, if the intake pressure PI is lower than the atmospheric pressure PA, the pressure PM is gradually decreased at every prescribed time period (period Δt), so as to prevent abrupt decrease of upper limit value VLM. Further, in the modification, the amount of decrease of pressure PM (difference between atmospheric pressure PA and pressure PM) is determined not to exceed ΔPmax. In the modification, pressure PM serves as a variable used for controlling boosting converter 242. In accordance with the modification, it becomes possible to protect motor generator and at the same time to prevent influence of abrupt change in motor generator output on the vehicle behavior.

Figure 14:
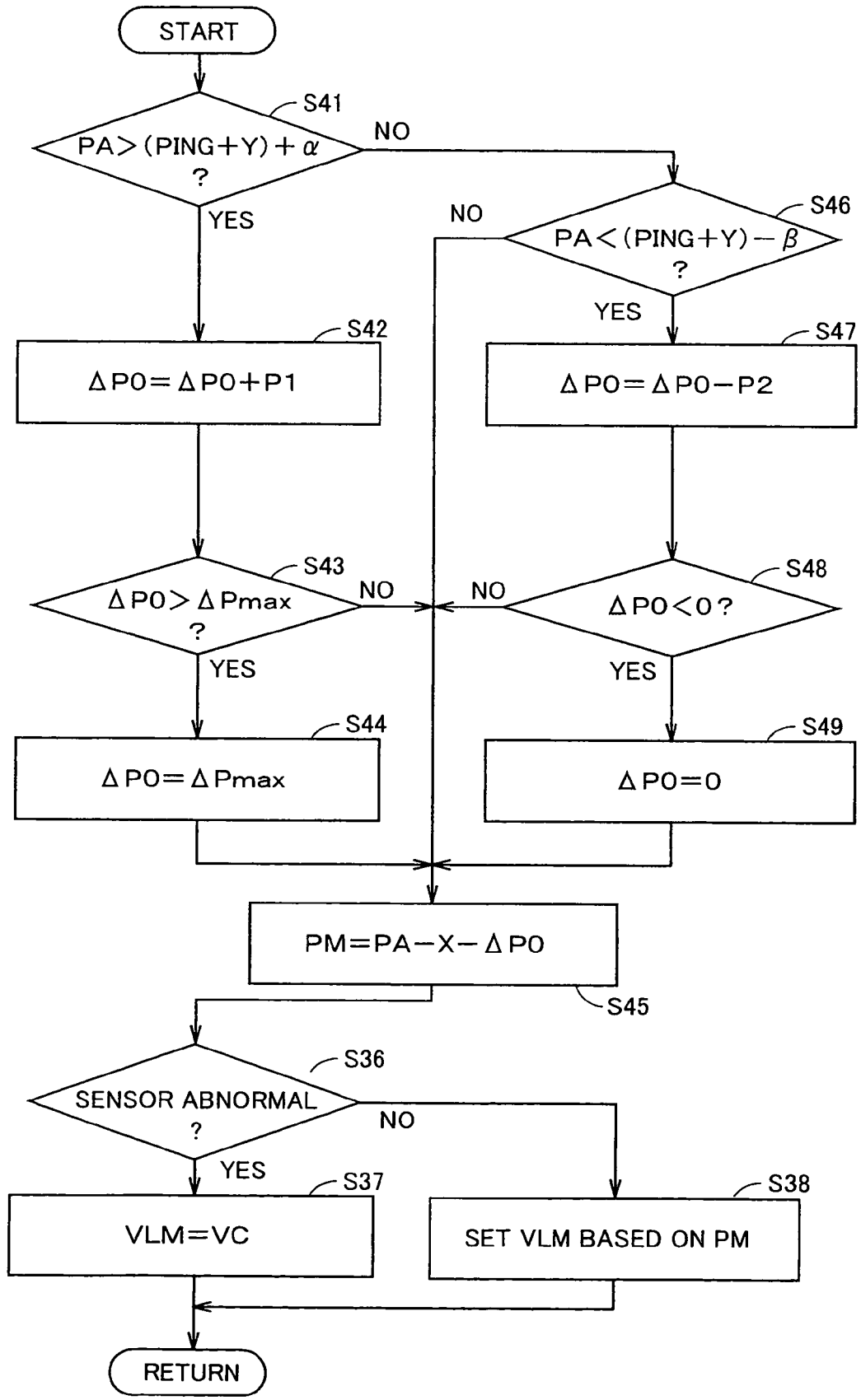
FIG. 14 is a flowchart representing the process by upper limit setting unit 312 in accordance with the modification.

FIG. 14 is a flowchart representing the process by upper limit setting unit 312 in accordance with the modification. The flowchart of FIG. 14 shows the process by upper limit setting unit 312 when the engine is not operating.

Referring to FIG. 14, upper limit setting unit 312 determines whether atmospheric pressure PA is larger than the sum of estimated engine pressure PING, pressure difference Y and a threshold value α (step S41). Here, the threshold value α is a value used in the process for decreasing the pressure PM. The threshold value α is a threshold value of difference between PA and (PING+Y), which is a positive value set in consideration of variation in pressure value.

If it is YES at step S41, that is, if PA is larger than (PING+Y)+α, upper limit setting unit 312 increases ΔP0, so as to decrease pressure PM (step S42). At step S42, upper limit setting unit 312 calculates a new ΔP0 by adding a fixed value P1 to ΔP0 calculated in the last process.

At step S43, upper limit setting unit 312 determines whether or not ΔP0 is larger than the maximum value ΔPmax. The maximum value ΔPmax is set to an arbitrary value that does not result in excessive correction. If ΔP0 is larger than the maximum value ΔPmax (YES at step S43), upper limit setting unit 312 sets ΔP0 to the maximum value ΔPmax (step S44). Then, upper limit setting unit 312 calculates the pressure PM in accordance with Equation (4) below.

$$PM=PA-X-\Delta P0 \qquad (4)$$

If ΔP0 is equal to or smaller than the maximum value ΔPmax (NO at step S43), upper limit setting unit 312 calculates pressure PM in accordance with Equation (4) (step S45).

If it is NO at step S41, that is, if PA is equal to or smaller than (PING+Y)+α, the pressure PM might be too low. If it is determined that pressure PM decreased excessively, upper limit setting unit 312 pushes back the pressure PM (steps S46 to S49). Specifically, first, at step S46, upper limit setting unit 312 determines whether PA is smaller than (PING+Y)−β (step S46). Here, β is a threshold value, which is a positive value set in consideration of variation in pressure value.

If it is NO at step S46, that is, if PA is equal to or larger than (PING+Y)−β, upper limit setting unit 312 calculates pressure PM in accordance with Equation (4) (step S45). If it is YES at step S46, that is, if PA is smaller than (PING+Y)−β, upper limit setting unit 312 determines that the pressure PM is too low. Then, upper limit setting unit 312 makes ΔP0 smaller to push back the pressure PM. At step S47, upper limit setting unit 312 calculates a new ΔP0, by subtracting a fixed value P2 from ΔP0 calculated in the last process. At step S48, upper limit setting unit 312 determines whether ΔP0 is smaller than 0. If ΔP0 is smaller than 0 (YES at step S48), upper limit setting unit 312 sets ΔP0 to 0 (step S49). Then, upper limit setting unit 312 calculates pressure PM in accordance with Equation (4) (step S45). If ΔP0 is equal to or larger than 0 (NO at step S48), upper limit setting unit 312 calculates pressure PM in accordance with Equation (4) (step S45).

If ΔP0 has a negative value, the pressure PM becomes larger than (PA−X) and, therefore, the voltage applied to the motor generator is also set higher than the voltage when the pressure PM is equal to (PA−X). However, ΔP0 is set not to be smaller than 0 and therefore, the pressure will be equal to or smaller than (PA−X). Consequently, the voltage applied to the motor generator becomes equal to or smaller than the voltage when the pressure PM is equal to (PA−X) and, therefore, the motor generator can more reliably be protected.

The processes of steps S36 to S38 shown in FIG. 14 are the same as those of steps S36 to S38 shown in FIG. 12, respectively, and therefore, detailed description will not be repeated. When the process of step S37 or S38 ends, the overall process returns to step S41.

If the engine is operating, upper limit setting unit 312 executes the process similar to that shown in the flowchart of FIG. 14. It is noted, however, that if the engine is operating, upper limit setting unit 312 sets the threshold value α at step S41 to (α+γ), and sets the threshold value β at step S46 to (β+γ). Here, γ represents an amount of correction for tolerance, for the pressure value variation experienced when the engine is operating.

As described above, in the present embodiment, a failure diagnosis of the atmospheric pressure sensor is made based on the result of detection by the atmospheric pressure sensor and the result of detection by an intake pressure sensor detecting intake pressure of an engine that changes in accordance with the change in the atmospheric pressure. Therefore, reliability of the boosting system can further be improved.

Further, in the present embodiment, the boosting circuit is controlled based on the result of detection by the atmospheric pressure sensor and the result of detection by the intake pressure sensor and, therefore, reliability of the boosting system can further be improved.

In the present embodiment, an example has been described in which the invention is applied to a series/parallel type hybrid system in which the engine power is split and transmitted to the axle and to the generator using a power split device. The present invention, however, is also applicable to a series type hybrid vehicle in which the engine is used solely for driving the generator and the driving force for the axle is generated only by the motor using the electric power generated by the generator.

Further, in the present embodiment, an example has been described in which the boosting converter is provided between the DC power source and an inverter driving the motor generator. The present invention, however, is also applicable when the boosting converter is provided for driving a load (for example, an auxiliary machine) other than the motor generator.

Further, in the present embodiment, an example has been described in which the intake pressure sensor of an engine is used for making a failure diagnosis of an atmospheric pressure sensor. It is noted, however, that the sensor used for making a failure diagnosis of the atmospheric pressure sensor in the present invention may be any sensor that detects a physical amount that changes in accordance with the change in atmospheric pressure and, for example, it may be an air flow meter.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A failure diagnosis device for a boosting system, including an atmospheric pressure sensor for detecting atmospheric pressure and for outputting said detected atmospheric pressure as a first detection result, a boosting circuit for boosting an input voltage and for providing an output voltage, and a control unit for controlling said output voltage of said boosting circuit based on said first detection result, and mounted on a vehicle having an internal combustion engine, comprising:
 a physical amount sensor for detecting intake pressure of said internal combustion engine as a physical amount that changes in accordance with said atmospheric pressure and for outputting said detected physical amount as a second detection result; and
 a diagnosis unit for making a failure diagnosis of said atmospheric pressure sensor based on said first and second detection results; wherein
 said diagnosis unit determines a time period from a time point at which said internal combustion engine stops until diagnosis of said atmospheric pressure sensor is started, based on a state of operation of said internal combustion engine until said internal combustion engine stops.

2. The failure diagnosis device for a boosting system according to claim 1, wherein
 when said internal combustion engine stops, said diagnosis unit starts diagnosis of said atmospheric pressure sensor after said intake pressure of said internal combustion engine becomes substantially equal to said atmospheric pressure.

3. The failure diagnosis device for a boosting system according to claim 1, wherein
 when said internal combustion engine is operating, said diagnosis unit makes a diagnosis of said atmospheric pressure sensor in a case where a condition as a predetermined condition for said intake pressure to stabilize is satisfied.

4. The failure diagnosis device for a boosting system according to claim 3, wherein
 said internal combustion engine has a throttle valve for adjusting amount of intake air to itself;
 said diagnosis unit estimates said intake pressure of said internal combustion engine based on a predetermined change ratio of said intake pressure with respect to opening position of said throttle valve and on said opening position of the throttle valve;
 said change ratio when said opening position is larger than a prescribed value is determined to be smaller than said change ratio when said opening position is smaller than said prescribed value; and
 said predetermined condition is that a state, in which said opening position of said throttle valve is equal to or lager than a prescribed value and difference between said intake pressure of said internal combustion engine estimated by said diagnosis unit and said second detection result is within a prescribed range, is continued for a prescribed time period or longer.

5. The failure diagnosis device for a boosting system according to claim 3, wherein
said internal combustion engine is provided with an air flow meter for measuring an amount of intake air of said internal combustion engine; and
said diagnosis unit holds in advance a theoretical amount of said amount of intake air of said internal combustion engine when said internal combustion engine operates under prescribed atmospheric pressure, calculates pressure difference between the theoretical pressure of the intake pressure under said prescribed atmospheric pressure and said second detection result, based on said theoretical amount and a value measured by said air flow meter, calculates a comparison value to be compared with said first detection result based on said pressure difference and said second detection result, in accordance with a condition that pressure difference between said prescribed atmospheric pressure and said theoretical pressure is constant regardless of said atmospheric pressure, and makes a failure diagnosis of said atmospheric pressure sensor based on said first detection result and said comparison value.

6. The failure diagnosis device for a boosting system according to claim 1, wherein
said diagnosis unit determines said atmospheric pressure sensor to be normal in a case where difference between said first and second detection results is within a tolerable range; and
said tolerable range is determined in advance to be different when said internal combustion engine is stopped and when said internal combustion engine is operating.

7. The failure diagnosis device for a boosting system according to claim 6, wherein
said diagnosis unit subtracts said first detection result from said second detection result and determines whether or not the result of subtraction is within said tolerable range;
a lower limit of said tolerable range is a negative value; and
an upper limit of said tolerable range is a positive value smaller than the absolute value of said lower limit.

8. A controller for a boosting circuit, mounted on a vehicle having an internal combustion engine, comprising:
an atmospheric pressure sensor for detecting atmospheric pressure and for outputting said detected atmospheric pressure as a first detection result;
a physical amount sensor for detecting intake pressure of said internal combustion engine as a physical amount that changes in accordance with said atmospheric pressure and for outputting said detected physical amount as a second detection result; and
a boosting control unit for making a failure diagnosis of said atmospheric pressure sensor and said physical amount sensor, and for controlling an output voltage of said boosting circuit, based on said first and second detection results; wherein
said boosting control unit determines a time period from a time point at which said internal combustion engine stops until diagnosis of said atmospheric pressure sensor is started, based on a state of operation of said internal combustion engine until said internal combustion engine stops.

9. The controller for a boosting circuit according to claim 8, wherein
said boosting control unit stores in advance a standard value of a value obtained by subtracting said second detection result from said first detection result, and controls said output voltage of said boosting circuit based on smaller one of said first detection result and a result of addition of said second detection result and said standard value.

10. The controller for a boosting circuit according to claim 8, wherein
in a case where said intake pressure of said internal combustion engine represented by said second detection result is lower than said atmospheric pressure represented by said first detection result, said boosting control unit sets a variable to be gradually decreased from said first detection result, and controls said output voltage of said boosting circuit based on a relation between said variable and a limit value of said output voltage of said boosting circuit and on said variable.

11. The controller for a boosting circuit according to claim 8, wherein
when a failure of at least one of said atmospheric pressure sensor and said physical amount sensor is detected, said boosting control unit sets said output voltage of said boosting circuit lower than when said atmospheric pressure sensor and said physical amount sensor are both normal.

12. A vehicle, comprising:
an internal combustion engine;
an atmospheric pressure sensor for detecting atmospheric pressure and for outputting said detected atmospheric pressure as a first detection result;
a boosting circuit for boosting an input voltage and for providing an output voltage;
a control unit for controlling said output voltage of said boosting circuit based on said first detection result;
a physical amount sensor for detecting intake pressure of said internal combustion engine as a physical amount that changes in accordance with said atmospheric pressure and outputting said detected physical amount as a second detection result; and
a diagnosis unit for making a failure diagnosis of said atmospheric pressure sensor based on said first and second detection results; wherein
said diagnosis unit determines a time period from a time point at which said internal combustion engine stops until diagnosis of said atmospheric pressure sensor is started, based on a state of operation of said internal combustion engine until said internal combustion engine stops.

13. A vehicle, comprising:
an internal combustion engine;
a boosting circuit;
an atmospheric pressure sensor for detecting atmospheric pressure and for outputting said detected atmospheric pressure as a first detection result;
a physical amount sensor for detecting intake pressure of said internal combustion engine as a physical amount that changes in accordance with said atmospheric pressure and for outputting said detected physical amount as a second detection result; and
a boosting control unit for making a failure diagnosis of said atmospheric pressure sensor and for controlling an output voltage of said boosting circuit, based on said first and second detection results; wherein
said boosting control unit determines a time period from a time point at which said internal combustion engine stops until diagnosis of said atmospheric pressure sensor is started, based on a state of operation of said internal combustion engine until said internal combustion engine stops.

* * * * *